United States Patent [19]

Piaton

[11] 4,443,858
[45] Apr. 17, 1984

[54] APPARATUS FOR READING MICROFICHES

[75] Inventor: Alain N. Piaton, Puteau, France

[73] Assignee: Anfor, Paris, France

[21] Appl. No.: 267,282

[22] Filed: May 27, 1981

[30] Foreign Application Priority Data

Jun. 2, 1980 [FR] France ............................. 80 12197

[51] Int. Cl.³ ...................... G06F 15/40; G03B 23/08
[52] U.S. Cl. ................. 364/518; 353/27 A; 364/900
[58] Field of Search ............ 364/518, 900; 353/26 A, 353/27 A, 74, 103, 120

[56] References Cited

U.S. PATENT DOCUMENTS

| | | | |
|---|---|---|---|
| 3,413,064 | 11/1968 | Roberts et al. | 355/42 |
| 3,596,253 | 7/1971 | Ruth et al. | 364/900 |
| 3,820,076 | 6/1974 | Butts | 364/900 |
| 3,885,867 | 5/1975 | Nelson et al. | 353/27 A |
| 4,086,469 | 4/1978 | Toriumi et al. | 353/27 A X |
| 4,122,613 | 10/1978 | Karalus et al. | 353/27 A X |

*Primary Examiner*—Joseph F. Ruggiero
*Attorney, Agent, or Firm*—James Creighton Wray

[57] ABSTRACT

This apparatus includes a keyboard for the search by user for successive regions of a microfiche bearing information which he needs, a microfiche reader itself having mechanically defined coordinates of the regions sought using the keyboard, and further having the capacity to project and present said regions and a control unit.

It is characterized in that the control unit comprises a microprocessor (31) with which are associated a first memory (47) containing data relating to the operation of the different elements of the apparatus and a second plug-in memory (48) containing data associated with the information borne by the microfiche and defining a decision tree, the microprocessor transmitting instructions to the elements (35, 37, 39) of the apparatus to present complementary information, so that the user can continue his search within the decision tree.

17 Claims, 7 Drawing Figures

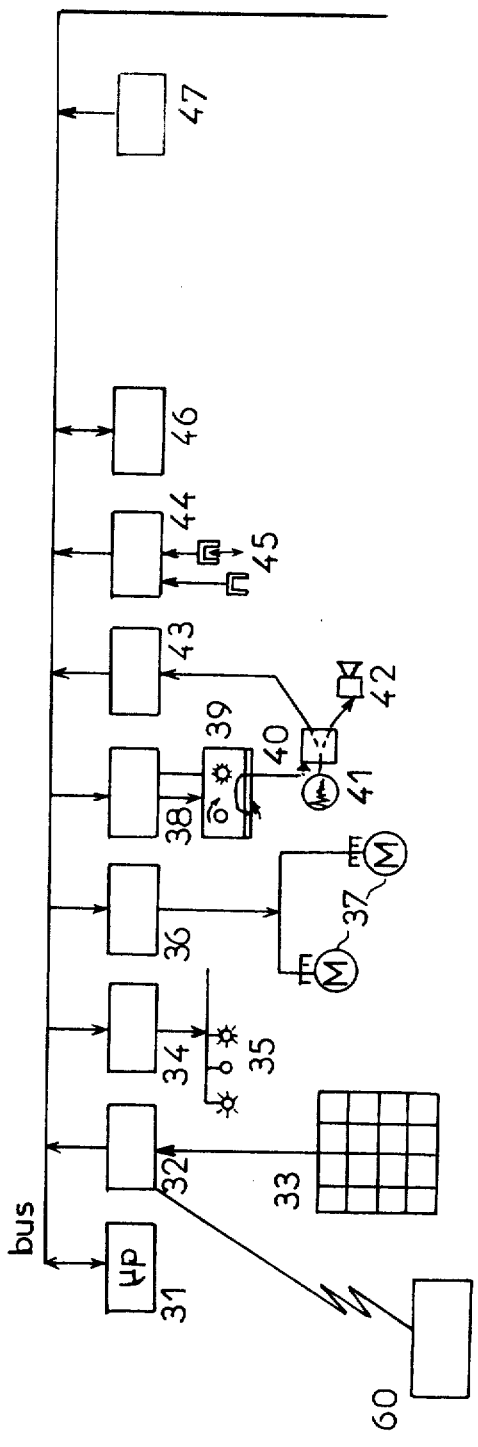
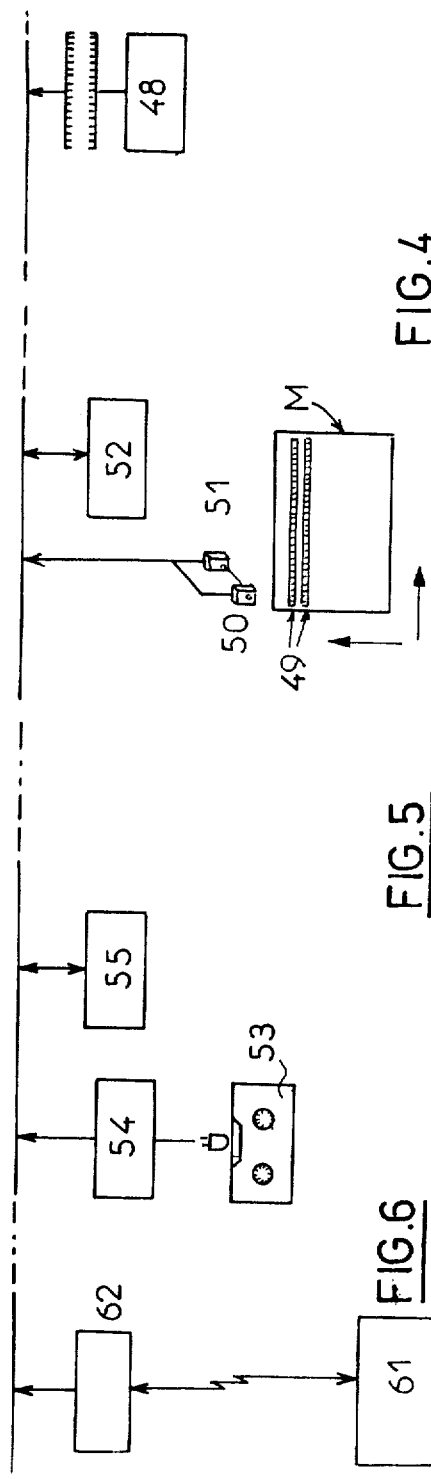

FIG.7

| Item Number | ACTIONS 66 | | | | | | 72 ITEM OUTPUT | | | | | |
|---|---|---|---|---|---|---|---|---|---|---|---|---|
| | INDICATOR LAMPS lit: X 7 8 9 10 11 12 13 14 15 16 | VIEW 67 Repeat Preceding P No view N° of view/N° of microfiche | | SOUND BLOCK R Repeat Preceding P Succeeding S Stop Sound | DURATION TEMPO | Block item B Follow-on automatic otherwise | Item n° Immediate Follow on if already reached | Return to previously performed P Knob N° | item Knob N° | Output with no exit-or Knob N° | Knob N° | B CONTACT N° |
| Compulsory Numbering 65 1 | 71 | 68 69 | | 70 | 75 | 76 | 77 | 73 74 | | | | 78 |

APPARATUS FOR READING MICROFICHES

The present invention relates to devices for presenting information and relates more particularly to apparatus for reading microfiches.

Information systems are known which use microfiches as the information support. In certain apparatus, the selection and displacement of the microfiche are ensured by motors, and the user types on a keyboard the x,y coordinates of the chosen view on the microfiche.

In other improved apparatus, a mini-computer is added, containing a equivalence table, so that when a code is typed on the key-board (for example an account number), the mini-computer transmits to the displacement system the coordinates (x,y,z) of the view to be projected. In such an apparatus, the function of the control unit consists only in transforming the search code into coordinates (x,y,z).

The disadvantage of such a system resides in the fact that it is not always possible to join a code onto information. In fact, in most searches, the user becomes aware of an item of information then, as a function of his problem, and of that item of information, looks for an additional item, and so on. Most often, the search for information consists in progressing within a decision tree, that is to say that at each stage there is interaction between the user and the information which is presented to him.

The object of the invention is thus to provide equipment which:

on one hand presents information in visual form (text, picture, sequence of pictures, drawing, indicator lights) and/or in audible form (sound sequences) that is to say audiovisual sequences;

on the other hand, as a function of the actuations of a keyboard by the user, actuations which are guided by the content of the audiovisual sequences, and of a program stored in the machine, ensures the follow-up of one audiovisual sequence by another.

The invention therefore has as an object the provision of apparatus for reading microfiches comprising a keyboard for search for the user for successive regions of a microfiche bearing information that he requires, a microfiche reader itself comprising mechanical means for defining the coordinates (x,y) of the successive regions of the microfiche searched for by the user by means of the keyboard, means for projecting and presenting the information contained in said successive regions of the microfiche and a unit for controlling the means for defining the coordinates of the regions of the microfiche, the means for projecting and the means for presenting, characterized in that said control unit comprises a microprocessor for processing the data entered by means of the keyboard, the data relating to the operation of the different elements of the apparatus stored in a first memory and the data, associated with the information borne by the different regions of the microfiche, stored in a second memory for sending to the different elements of the apparatus the instructions necessary for indicating the information sought.

Other features of the invention will appear from the following description, given with reference to the accompanying drawings, which are given only by way of example and in which:

FIG. 3 is a schematic diagram of the microfiche reader in accordance with the invention;

FIG. 4 is a schematic diagram showing a variant of the storage means for the parameters of the apparatus of FIG. 3;

FIG. 5 is a schematic diagram showing another variant of the storage means for the user parameters;

FIG. 6 is a diagram of yet another variant of the storage means for the user parameters;

FIG. 7 shows a decision table grouping the user parameters together.

Figures 1, 2:
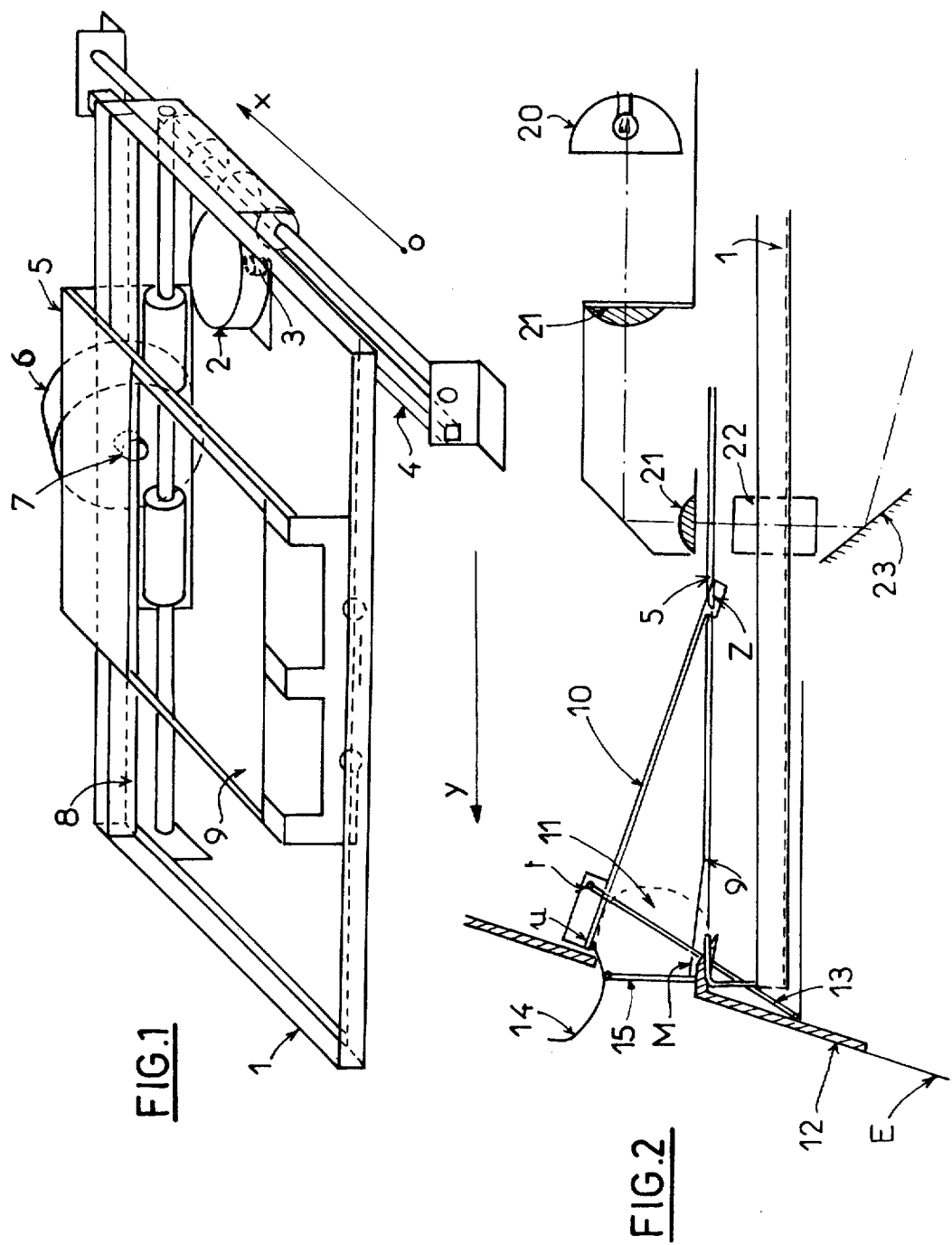
FIG. 1 is a perspective view of the table of a microfiche reader in accordance with the invention.
FIG. 2 is a view partly in section to a larger scale of the microfiche ejection means of the apparatus in accordance with the invention.

The apparatus has several parts:

It comprises first of all a microfiche projector (for example of A6 format: 105×148 mm), in which a microfiche M is displaced in front of an objective (or vice-versa) in the two directions (x,y) as a function of the orders given by a control unit in such a way that one or another image of the microfiche appears on the display screen.

In the preferred embodiment of the invention, shown in FIG. 1, a first carriage 1 is used, providing displacement in a first direction X by means of an electric motor 2, of the stepping kind, mounted on the carriage 1, which drives a toothed wheel 3 acting on a rack 4 solid with the chassis of the apparatus. A second carriage 5 moves on the carriage 1 in a direction Y perpendicular to the direction X by means of a second stepping motor 6, mounted on this second carriage, which drives a toothed wheel 7 acting on a second rack 8 solid with the first carriage 1.

Obviously, the positions of the motors and the racks could be changed over.

This second carriage comprises two transparent plates 9 and 10 (FIG. 2) which sandwich the microfiche during the displacements in front of the objective; one of the plates 9 is solid with the carriage 5, whereas the other plate 10 is movable about an axis Z so that by lifting up this plate, the microfiche can be placed between the two plates.

The projecting can be provided with a device enabling a microfiche to be selected within a magazine so as to pass from an image of one microfiche to another image of another microfiche without manual intervention.

More simply, the projector can be provided with a system for introducing or ejecting the microfiche so that the user introduces a microfiche into, or takes it out of a slot 11 formed in the face 12 of the apparatus. In a preferred embodiment of the invention, shown in FIG. 2, the displacement of the second carriage 5 towards the slot 11 is used to raise the movable plate 10 by means of a push-rod 13, fixed to the end of the movable plate 10, which abuts against the face 12 of the apparatus during the ejection phase; this push rod can readily be formed out of wire in a U-shape oscillating on the plate 10 about an axis t parallel to the axis Z. The shape of the slot 11 enables the microfiche M to be grasped without having to use an ejector other than what has just been described. The displacement of the upper carriage 5 can also be used to raise shutter 14 which masks the slot during the projection of the microfiche, by positioning at the front of the carriage 5 two vertical rods 15 which push the shutter 14 to pivot it about its axis u.

For heat dissipation reasons, it can be preferable to position the lamp 20 (and possibly the condenser 21) of the projector above the plane of the microfiche M, while the objective 22, the mirrors 23 and the screen (not shown) are positioned underneath the plane of the microfiche M.

The apparatus also comprises an indication device 33, hereinater called "keyboard" (FIG. 3) by means of which the user gives his commands to the apparatus, it can be a numeric or alphanumeric keyboard with 12 or 16 keys, as in telephones, or even a keyboard with illuminated knobs.

It can also be a transparent board mounted in front of the display screen referred to above, such that when the user touches it with his finger (or with a tool) in a zone of the image projected on the screen, the part of the board interposed between the finger (or tool) and the image transmits to the control unit a signal characterizing the point indicated. In a preferred embodiment of the invention, a transparent matrix board is used, comprising two orthogonal sets of transparent electret transducers.

More generally, these commands can come from the keyboard referred to or from another apparatus, such as the apparatus 60 of FIG. 3, formed for example by a text processing machine, a test rig, an industrial process control device, or a computer. These apparatus can be connected to the control unit either directly (for example current loop) or indirectly by teletransmission systems (for example modum link, optic fiber and so on).

With a view to facilitating the communication between the user and the apparatus, the apparatus has an indicator device; it can be an indicator device having a cathode ray tube, or plasma screen, or a luminescent diode device or a segment indicator. Certain luminous signals can be positioned on the keys of the keyboard (illuminated knobs).

The machine can also comprise a device for photocopying or for telecopying information projected on the screen (for example a television circuit or facsimile transmitter and so on) or a system for printing on a permanent support (for example a line printer).

The apparatus also comprises a magnetic cassette player whose different functions can be controlled electrically (for example a Tanashin TN 5000 deck) and on which the sound sequences will be placed. These different sound sequences are stored one after the other on the tape, each of them being characterized by its starting position and its length (or its end position). For proper operation of the apparatus, it is necessary to pass rapidly from one sequence to another. To this end, a marker for the start of the sequence can be detected by winding the tape at high speed past the read head 41 (FIG. 3) in contact with the tape.

In a preferred embodiment of the invention, the start of each sequence is detected by its position expressed as the number of revolutions from the start of the tape. For this, a revolution counter (not shown) is used, and can be formed by a disc with a slot which rotates between a luminous source and a photoelectric cell (opto electronic fork pick-up). As the tension in the tape is not constant, the position of the start of a sound sequence expressed in number of revolutions relative to the beginning can vary from one time to another; in a preferred embodiment of the invention, the rapid search sequence occurs in the following manner:

In a first phase, the tape is wound at high speed (read head disengaged) in the desired direction for a certain number of revolutions, corresponding to the difference between the current position (estimated) expressed as the number of revolutions, and the theoretical position of the start of the sequence sought (expressed also in number of revolutions). To take account of the differences referred to above, a safety margin is allowed and the aiming point is not the start of the sequence sought, but a position slightly in advance of this start.

In a second phase, the apparatus is switched to slow reading and reads a track on the tape (which can be the sound track for example); on this track, are positioned the markers whose theoretical position is memorized in the control unit, so that when the apparatus, in slow reading mode, reads one of the markers, it recalibrates the revolution counter if it has drifted, to correspond with the memorized theoretical value.

With this procedure, the counter is recalibrated at each rapid search, and the start of each sequence is guaranteed errorfree in position, without having to allow a large safety margin.

In applications which do not require commentary texts which are too long, the cassette reader can be replaced by a vocal synthesizer coupled to a nonvolatile memory.

The apparatus finally comprises a recorded program control unit; this control unit itself comprises, in one or more container, the following means shown in FIG. 3:

a microprocessor 31, read gates 32 connected to the keyboard 33; in the case where a capacitive electret board is used, a signal amplifier device. will be used, output gates 34 for lighting the luminous indicators 35, output gates 36 which control the different phase of the stepping motors 37 for displacing the carriages 1 and 5, gates 38 which control the different motors and electromagnets 39 of the cassette reader deck and which provide a circuit 40 for switching the signal provided by the read head 41 either to an amplifier 42 for sound or to a circuit 43 for decoding the markers which transforms the signals recorded on the magnetic tape into characters which can be used by the microprocessor. An FSK decoder can be used with a series parallel interface, for example.

The control unit shown in FIG. 3 also comprises gates 44 connected to the opto electronic pick-up 45 which count the number of revolutions of the tape reader, detect the opening of the shutter 14 (FIG. 2) of the microfiche reader, detect the abutment of the carriages 1 and 5 against the stops, an active RAM memory 46 containing the program operation variables and a memory 47 comprising the instructions which, as a function of the actuations of the keyboard (or other events as will be explained below) and of the program to be carried out, ensure the follow on of one audiovisual sequence by another.

The program for use in the apparatus according to the invention may comprise inseparably instructions for ensuring the connections with the different elements of the apparatus and instructions relating particularly to the use of the apparatus.

In a preferred embodiment of the invention, the program is organised in a different manner, as follows:

The commands of the user are presented in the form of parameters grouped in a decision table; hereinafter, the set of these parameters will be called "user program". These parameters are utilized by a program (hereinafter called a parametered program) which ensures the connection with the different elements of the apparatus and moreover triggers the following on of the audio-visual sequences as a function of these parameters and of the interventions of the user on the keyboard, or other events. This parametered program is independent of the particular application. This is advantageous as it is possible to store the parametered program permanently in the apparatus, in a passive memory 47. As for the parameters, they can be stored on another support. There are two distinct families of support:

In the embodiment illustrated, the support is a cartridge 48 having a non-volatile memory which can be connected to the central unit by means of a connector (for example REPROM, PROM, ROM, XERAOM, battery RAM, NVRAM, bubble memory). In this case, as soon as the cartridge 48 is plugged into the control unit, the program can utilize the parameters. If the set of parameters is too large to be held in a single cartridge, the set can be segmented onto several cartridges so that the program will run in several successive phases, each corresponding to one cartridge.

In a variant, the parameters can also be stored on a support external to control unit: for example on tracks 49 situated on the microfiche M parallel to the sides of the microfiche. In this case, the system for displacing the microfiche in front of the objective 22 (FIG. 2) is used for displacing the tracks 49 in front of the read system; the tracks can be magnetic. In a preferred embodiment of the invention, an optical coding is used; the parameters of the user program are then represented by a succession of dashes and spaces which pass between a luminous source 50 and a photoelectric pick-up 51.

As shown in FIG. 5, these parameters can also be stored on an ordinary magnetic support such as a cassette 53, floppy discs, magnetic cards, and so on, connected to a decoder 54 associated with a memory 55 similar to the memory 52 of the variant of FIG. 4

At the start of the program, these parameters are read and stored in an active memory 52, an RAM for example, of the control unit; from this moment on, they can be read by the parametered programme to control the follow on of the images as a function of the commands typed on the keyboard 33.

Unlike the plug-in magnetic cartridge which connects the control unit immediately with the parameters, in the arrangements described above, the initial phase is a read phase which can last several seconds. If the set of parameters is too voluminous to be held all at once in the active memory of the apparatus, the user program can be segmented into several parameters sets which are loaded in succession into the active memory and which correspond to different phases of the user program.

According to another variant, shown in FIG. 6, the parameters can also be stored either partially or wholly in another computer 61, adjacent or remote and transmitted to the control unit through an interface 62 either as a whole, during an initial loading phase, or in several phases or in elementary blocks. In the two latter cases, the control unit sends back to the other computer 61 the elements describing its state (for example a particular key actuated).

The presentation of the user parameters will now be described with reference to FIG. 7. The user parameters are presented in the form of a decision table in which each line corresponds to an elementary audiovisual sequence of the user program.

An elementary audiovisual sequence, hereinafter called an item, is characterized by:

the projection of an image or a series of images on the screen,
playback of a sound sequence,
lighting of a set of indicator lamps.

If the same sound sequence and the same image or sequence of images is kept, but a further indicator lamp is lit, one passes to another item, that is to say that an item is the largest audiovisual sequence during which one has the same images or series of images, the same sound sequence and the same set of indicator lamps lit.

It should be noted that the play back of a sound sequence comprises two phases:
search for the sound sequence,
play back of the sound sequence.
It is the same for the images:
search for the image (or for the sequence of images)
projection of the image (or the sequence of images).

According to the type of usage of the apparatus, the item will be defined in the manner indicated above, or it will have a finer definition, that is to say that the search for the image or images or the search for the sound sequences will be considered as particular images (or series of images) or particular sound sequences.

Each line of the decision table which is identified by number 65 comprises two parts:

the description 66 of the elementary audiovisual sequence or item, that is to say the number of the image 67 (or of a series of images) to be projected on the screen (in the case where there are several microfiches, the number 68 of the microfiche M and the number 69 of the view on the microfiche are specified), the number 70 of the sound sequence the numbers of the indicator lamps to be lit (they can be specified on a grid where each lamp has its position 71)

in addition, the definition of the conditions 72 which enable the passage from a given item to another. There are two distinct cases:

for actuations of the keyboard 33 by the user (FIG. 3) are specified, for each of the active keys, the number of the key and the number of the item which the apparatus must switch to when this key is actuated (formulation in variable format); the same result is obtained in fixed format by specifying for each of the keys utilized by the user, shown at 73 in FIG. 7 the number 74 of the item to which one must switch (the number of the key is implicit and given by its position on the programming grid).

the passage to another item can also be triggered by an event detected by another element of the machine than the keyboard:

the control unit can include a clock; in this case after a certain duration which is defined and which appears in the column 75 "timing duration", the machine switches automatically to another item designated in column 76 "automatic follow on after time out". This is particularly useful for triggering a succession of several images (for example one every second) or else to switch to another item if the user has not typed on the keyboard before a certain time.

the event can be the end of searching for the sound sequence, or again the end of playing back the sound sequence; in this case, a code specifies the relevant type of event (end of seach or end of playback) and the item to which to switch; in the table of FIG. 7, the same columns are used as for the time out triggering. This possibility enables sound and image synchronization.

the event can be the fact that this item has already been reached at least once, since the start of the programme (event memorized in the active memory 52 of the apparatus—FIG. 3). In this case, the apparatus switches away immediately without presenting any audiovisual sequence to another item specified in that column 77 "follow on immediately if already reached".

the event can also be a signal coming from the adjacent or remote apparatus 60 shown in FIG. 3 which is codified by placing the number of the following item in the column 78 "contact".

The apparatus which has just been described combines a relatively simple design with a large flexibility in use. It is particularly well suited especially for containing and presenting information relating especially to railway timetables and can, with advantage, replace the train indicator boards commonly used until now.

I claim:

1. Apparatus for displaying microfiche data, comprising manually actuable means for actuation by a user to indicate successive desired display regions of at least one microfiche from a set, the regions bearing information which the user needs, a microfiche reader comprising mechanical means for defining the coordinates of the regions to be displayed, means for projecting and presenting the information in said regions, and control means for controlling said mechanical means and said projecting and presenting means, said control means comprising a microprocessor for processing data entered by said manually actuable means, data relating to the operation of the different components of the apparatus and data associated with the information borne by the different regions of the microfiche, characterized in that said control means comprises memory means for storing said data, said microprocessor (31) being responsive to said stored data for transmitting to the different elements (35,37,39) of the apparatus the instructions necessary for presenting the information sought and also complementary information, said projecting and presenting means having means adapted to present a decision tree within which the user can continue his search according to indications contained in said complementary information.

2. Apparatus according to claim 1, characterized in that at least part of the memory means consists of at least one plug-in non-volatile memory (48).

3. Apparatus according to claim 1, characterized in that at least part of the memory means consists of tracks (49) borne by said microfiche, means (50,51) being provided for reading the data contained in said tracks and for transmitting the data to the microprocessor (31) of the control unit.

4. Apparatus according to claim 1, characterized in that at least part of the memory means is contained in another computer.

5. Apparatus according to claim 1, characterized in that said projecting and presenting means also comprises a device for indicating variable images.

6. Apparatus according to claim 1, characterized in that said projecting and presenting means also comprises means for presenting sound sequences consisting of a vocal synthesizer.

7. Apparatus according to claim 1, characterized in that said manually actuable means is a transparent board.

8. Apparatus according to claim 1, characterized in that said projecting and presenting means also comprises data printing means.

9. Apparatus according to claim 1, characterized in that said control means also comprises separate data input means (60).

10. Apparatus according to claim 1, in which the mechanical means for defining the coordinates of the successive regions of the microfiche comprise carriages displaceable relative to each other in perpendicular directions, characterized in that it also comprises means for ejecting the microfiche, consisting of first and second transparent plates (9,10) carried by one of said carriages (5) for sandwiching the microfiche (M), the first plate (9) being solid with said carriage (5) while the second plate (10) is hinged on a edge of the first plate, at least one push rod (13) being pivoted on an edge of the first plate (9) and being arranged to abut against a face (12) of the apparatus during an ejection phase to raise the second plate (10) and cause the edge of the microfiche (M) to appear in a slot (11) in said face (12).

11. Apparatus for displaying microfiche data, comprising manually actuable means for actuation by a user to indicate successive desired display regions of at least one microfiche from a set, the regions bearing information which the user needs, a microfiche reader comprising mechanical means for defining the coordinates of the regions to be displayed, means for projecting and presenting the information in said regions, and control means for controlling said mechanical means and said projecting and presenting means, said control means comprising a microprocessor for processing data entered by said manually actuable means, operation data relating to the operation of the different components of the apparatus and parameter data associated with the information borne by the different regions of the microfiche, characterized in that said control means comprises memory means for storing said operation and parameter data, said microprocessor (31) being responsive to said operation data for transmitting to the different elements (35,37,39) of the apparatus the instructions necessary for presenting the information sought and also complementary information enabling the user to continue his search within a decision tree according to indications contained in said complementary information, said memory means including at least one plug-in non-volatile memory (48) for storing at least part of said parameter data whereby to define the decision tree.

12. Apparatus according to claim 11, characterized in that part of the memory means is contained in another computer.

13. Apparatus according to claim 11, characterized in that it also comprises a device for displaying video images, said control means being connected to control said device in relation to complement said information.

14. Apparatus according to claim 11, characterized in that it also comprises means for presenting sound sequences consisting of a vocal synthesizer, said control means being connected to control said vocal synthesizer to complement said information.

15. Apparatus according to claim 11, characterized in that said manually actuable means comprises a transparent board.

16. Apparatus according to claim 11, characterized in that it also comprises data printing means, said control means being connected to control said printing means to print desired information.

17. Apparatus according to claim 11, in which said mechanical means for defining the coordinates of the regions of the microfiche comprise a first carriage for supporting said microfiche and a second carriage bearing said first carriage, said carriages being mounted for displacement in perpendicular directions, relative to said projecting and presenting means, characterized in that said mechanical means also comprises means for ejecting the microfiche, consisting of first and second transparent plates (9,10) carried by said first carriage (5) for sandwiching the microfiche (M), the first plate (9) being solid with said first carriage (5), the second plate (10) being hinged on an edge of the first plate, and at least one push rod (13) which is pivoted on an edge of the second plate (10) and is arranged to abut against a face (12) of the apparatus during the ejection phase to raise the second plate (10) and cause the edge of the microfiche (M) to appear in a slot (11) in said face (12).

* * * * *